US012786336B2

(12) United States Patent
Oda et al.

(10) Patent No.: US 12,786,336 B2
(45) Date of Patent: Nov. 3, 2026

(54) FILE PROVIDING METHOD AND SYSTEM WITH IMAGE INPUT APPARATUS RECEIVING PERMISSION OPERATION FOR ENABLING DATA TRANSMISSION

(71) Applicant: PFU LIMITED, Ishikawa (JP)

(72) Inventors: Tetsuo Oda, Ishikawa (JP); Yasuhito Nagakoshi, Ishikawa (JP); Asako Kinoshita, Ishikawa (JP)

(73) Assignee: PFU Limited, Ishikawa (JP)

( * ) Notice: Subject to any disclaimer, the term of this patent is extended or adjusted under 35 U.S.C. 154(b) by 49 days.

(21) Appl. No.: 18/563,722

(22) PCT Filed: May 25, 2021

(86) PCT No.: PCT/JP2021/019818
§ 371 (c)(1),
(2) Date: Nov. 22, 2023

(87) PCT Pub. No.: WO2022/249286
PCT Pub. Date: Dec. 1, 2022

(65) Prior Publication Data
US 2024/0275898 A1 Aug. 15, 2024

(51) Int. Cl.
*H04N 1/21* (2006.01)
*G06F 16/16* (2019.01)
*H04N 1/00* (2006.01)

(52) U.S. Cl.
CPC ......... *H04N 1/2104* (2013.01); *G06F 16/162* (2019.01); *H04N 1/00244* (2013.01); *H04N 1/00824* (2013.01)

(58) Field of Classification Search
CPC ............. H04N 1/2104; H04N 1/00244; H04N 1/00824; G06F 16/162
See application file for complete search history.

(56) References Cited

U.S. PATENT DOCUMENTS 6,735,665 B1 5/2004 Kumangai et al.
11,516,353 B2 * 11/2022 Hanano .............. H04N 1/00244
(Continued)

FOREIGN PATENT DOCUMENTS

JP 2001-036701 A 2/2001
JP 2004-086731 A 3/2004
(Continued)

OTHER PUBLICATIONS

Office Action received in corresponding Japanese Patent Application No. 2023-523764, dated Jul. 23, 2024, w/ English Translation.
(Continued)

*Primary Examiner* — Nicholas Pachol
(74) *Attorney, Agent, or Firm* — Rimon P.C.

(57) ABSTRACT

A system that enables an appropriate sharing of a scanner with a simple procedure is provided.

A data file providing method includes a step of, by a scanner, uploading a data file generated by scanning process to a file relay apparatus on the Internet. The data file providing method includes a step of, by the file relay apparatus, storing the uploaded data file in a temporary storage location. The data file providing method includes a step of, by the scanner, displaying information indicating a uniform resource locator (URL) of the temporary storage location. The data file providing method includes a step of, by the file relay apparatus, transmitting the data file stored in the temporary storage location in response to a web access based on the URL.

9 Claims, 11 Drawing Sheets

OVERALL SEQUENCE (S10)

(56) References Cited

U.S. PATENT DOCUMENTS

| | | | | |
|---|---|---|---|---|
| 2007/0195357 | A1* | 8/2007 | Matsuba | G06F 3/1204 358/448 |
| 2009/0282001 | A1 | 11/2009 | Fukuda | |
| 2011/0267649 | A1* | 11/2011 | Akimoto | H04N 1/4433 358/1.15 |
| 2012/0110066 | A1* | 5/2012 | Furuta | H04L 67/02 709/203 |
| 2012/0140275 | A1 | 6/2012 | Fukuda | |
| 2015/0268894 | A1* | 9/2015 | Saito | G06F 3/1206 358/1.16 |
| 2016/0014283 | A1* | 1/2016 | Nakano | H04N 1/00212 358/1.13 |
| 2016/0065683 | A1* | 3/2016 | Saito | G06F 3/1287 709/203 |
| 2016/0112422 | A1 | 4/2016 | Watanabe | |
| 2016/0224947 | A1* | 8/2016 | Ishimaru | G06F 21/608 |
| 2016/0277401 | A1 | 9/2016 | Yamada | |
| 2017/0302807 | A1* | 10/2017 | Kuno | H04L 67/1097 |
| 2018/0067707 | A1* | 3/2018 | Fukushima | G06F 3/121 |
| 2018/0359375 | A1 | 12/2018 | Seo | |
| 2019/0089864 | A1 | 3/2019 | Nakabayashi | |
| 2020/0288024 | A1* | 9/2020 | Yamaguchi | H04N 1/00244 |
| 2021/0211553 | A1* | 7/2021 | Kobayashi | H04N 1/32122 |
| 2022/0070329 | A1* | 3/2022 | Hoshino | H04N 1/32117 |

FOREIGN PATENT DOCUMENTS

| | | | |
|---|---|---|---|
| JP | 2005-129976 | A | 5/2005 |
| JP | 2014-007483 | A | 1/2014 |
| JP | 2018-206201 | A | 12/2018 |
| JP | 2019-53632 | A | 4/2019 |
| JP | 2019-192016 | A | 10/2019 |
| JP | 2020-044769 | A | 3/2020 |
| JP | 2020-145493 | A | 9/2020 |
| JP | 2021-077948 | A | 5/2021 |
| JP | 2022-045185 | A | 3/2022 |

OTHER PUBLICATIONS

Office Action received in corresponding United States U.S. Appl. No. 18/318,529, dated Jul. 22, 2024.

Non-Final Office Action received in corresponding U.S. Appl. No. 18/318,529, dated Feb. 6, 2024.

International Search Report received in International Application No. PCT/JP2021/019818, dated Jul. 6, 2021.

* cited by examiner

FIG. 6

| MANAGEMENT TABLE | | | |
|---|---|---|---|
| SCANNER A | FILE A1 | URL_A1 | VALIDITY PERIOD A1 |
| SCANNER A | FILE A2 | URL_A2 | VALIDITY PERIOD A2 |
| ... | ... | ... | ... |

OVERALL SEQUENCE (S10)

OPERATION BY SCANNER (S20)

OPERATION BY SERVER (S30)

FILE PROVIDING METHOD AND SYSTEM WITH IMAGE INPUT APPARATUS RECEIVING PERMISSION OPERATION FOR ENABLING DATA TRANSMISSION

CROSS-REFERENCE TO RELATED APPLICATIONS

This application is the U.S. National Phase under 35 U.S.C. § 371 of International Application No. PCT/JP2021/019818, filed on May 25, 2021.

TECHNICAL FIELD

The present invention relates to a file providing method, a scanner, and a file providing system.

BACKGROUND ART

For example, Patent Literature (PTL) 1 discloses a network system in which a digital copying machine 1 transmits image data of a read document to a web server 4, the digital copying machine 1 transmits a uniform resource locator (URL) of a storage destination of the transmitted image data to personal computers 3*a* and 3*b* through the Internet in an email format, and users of the personal computers 3*a* and 3*b* receiving the email from the digital copying machine 1 can browse an image read by the digital copying machine 1 and download the image to the personal computers 3*a* and 3*b* by accessing the URL designated by the email. Further, PTL 2 discloses a scan mail transmission system that causes a scanner 12 to generate image data of a document, automatically generates a password, uploads a file of the image data to a server apparatus (a web server 42 for uploading) in a manner that only a person who knows the password can download the file of the image data with a web browser, and transmits a scan mail including a URL and a password relating to the uploaded file in a body of a message with a designated address as a destination address.

Further, PTL 3 discloses a printing system in which a storage area allocation request unit 22 requests a server apparatus 50 to allocate a storage area 72 for specific image data in response to a request for image printing, an image code generation unit 23 generates a QR code Ac_QR recording a URL for access to the storage area 72, a display control unit 24 displays the QR code Ac_QR on a display 40, a specific image data acquisition unit 25 acquires specific image data Pdat from the server apparatus 50 by use of the URL for access, and a print control unit 26 inputs the specific image data to a printing unit 43 to have an image to be printed.

Further, PTL 4 discloses a print system including a server apparatus and a printing apparatus. The server apparatus receives image data from a terminal, generates identification information corresponding to the image data, stores the identification information and the image data in association with each other, generates a two-dimensional code image indicating the identification information, and transmits the two-dimensional code image to the terminal. The printing apparatus acquires the identification information by reading the two-dimensional code image displayed on a display of a portable terminal, and notifies the server apparatus of the identification information. The server apparatus transmits the image data corresponding to the identification information notified from the printing apparatus to the printing apparatus, and the printing apparatus performs printing process using the image data received from the server apparatus and outputs a printed matter.

CITATION LIST

Patent Literature

[PTL 1]
Japanese Unexamined Patent Application Publication No. 2005-129976
[PTL 2]
Japanese Unexamined Patent Application Publication No. 2004-086731
[PTL 3]
Japanese Unexamined Patent Application Publication No. 2020-044769
[PTL 4]
Japanese Unexamined Patent Application Publication No. 2019-192016

SUMMARY OF INVENTION

Technical Problem

An object of the present invention is to provide a system that can appropriately share a scanner with a simple procedure.

Solution to Problem

A data file providing method according to the present invention includes a step of, by a scanner, uploading a data file generated by scanning process to a file relay apparatus on the Internet. The data file providing method includes a step of, by the file relay apparatus, storing the uploaded data file in a temporary storage location. The data file providing method includes a step of, by the scanner, displaying information indicating a uniform resource locator (URL) of the temporary storage location. The data file providing method includes a step of, by the file relay apparatus, transmitting the data file stored in the temporary storage location in response to a web access based on the URL.

Preferably, the data file providing method further includes a step of, by the scanner, receiving an operation for permitting transmission of the data file. Preferably, in the step of transmitting, the file relay apparatus enables the transmission of the data file stored in the temporary storage location when the scanner receives the operation for permitting.

Preferably, the data file providing method further includes a step of, by the file relay apparatus, deleting the data file from the temporary storage location after completing the transmission of the data file.

Preferably, the data file providing method further includes a step of, by the file relay apparatus, deleting the data file stored in the temporary storage location when a certain period of time elapses from a time when the data file is uploaded or a time when the information indicating the URL becomes displayable at the scanner.

Preferably, in the step of displaying, the scanner displays a two-dimensional code indicating the URL of the temporary storage location.

Further, a scanner according to the present invention includes an access unit to automatically access a server on the Internet in response to an operation for starting scanning operation. The scanner includes a transmission unit to automatically transmit a data file generated by scanning process to the server accessed by the access unit. The scanner includes a URL display unit to display information indicating a URL received from the server.

Preferably, in response to a start of the scanning operation, the transmission unit successively transmits data obtained by scanning to the server. Preferably, the scanner further includes a deletion request unit to request the server to delete the transmitted data when an error occurs during the scanning operation.

Preferably, the access unit automatically accesses the server based on access destination information registered in advance before the scanner is shipped from a factory.

Further, a file providing system according to the present invention includes a scanner and a file relay apparatus connected to the scanner through the Internet. The scanner includes an access unit to access the file relay apparatus in response to an operation for starting scanning operation. The scanner includes a transmission unit to transmit a data file generated by scanning process to the file relay apparatus accessed by the access unit. The scanner includes a URL display unit to display information indicating a URL of a storage location of the data file. The file relay apparatus includes a file storage unit to store the data file received from the transmission unit of the scanner in any given storage location. The file relay apparatus includes a file sending unit to send the data file stored in the storage location in response to a web access based on the URL from the scanner.

Advantageous Effects of Invention

A scanner can be appropriately shared with a simple procedure.

BRIEF DESCRIPTION OF DRAWINGS

FIG. 6 is a diagram illustrating an example of information registered in a management database 370.

DESCRIPTION OF EMBODIMENTS

Figure 1:
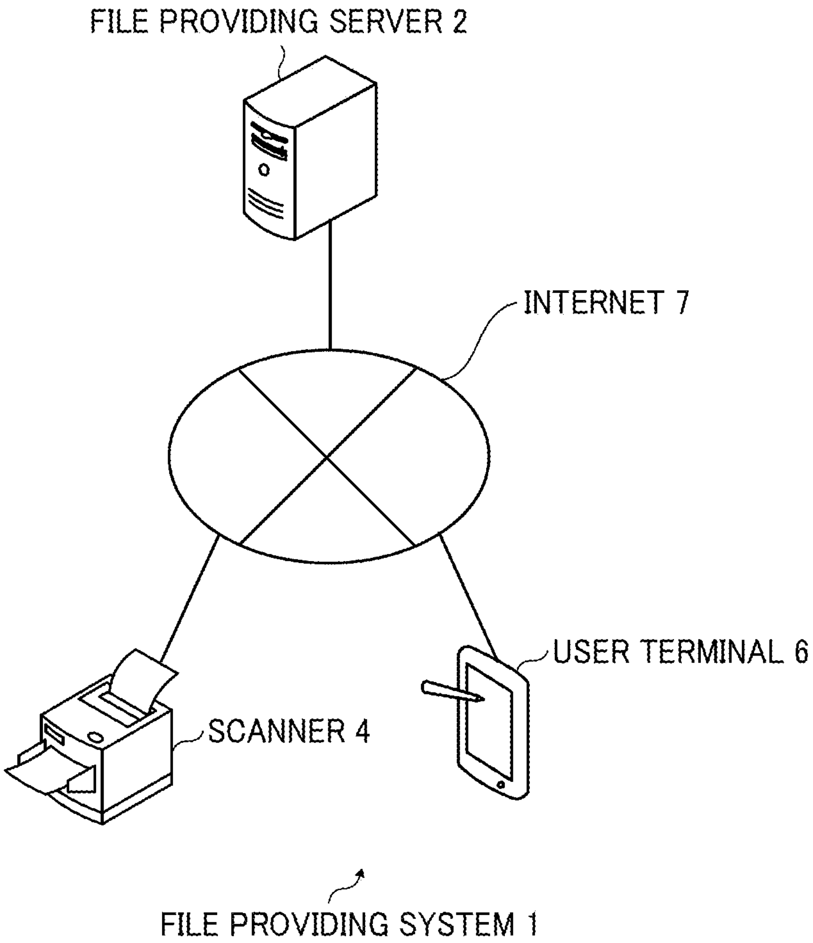
FIG. 1 is a diagram illustrating an example of an overall configuration of a file providing system 1.

First, a description is given of the background of the present invention.

As a typical method of acquiring scanned image data using a scanning function of an image scanner or a multifunction peripheral, it is general that temporarily storing the scanned image data in, for example, a local storage of a personal computer, a network folder, or a cloud storage first, and then referring to or copying the data. Further, in most cases, it is assumed that a user of the scanning function is an owner of the scanner (or an organization to which the user belongs is the owner). Accordingly, in order to use the scanning function, it is required at first that installing driver software or a mobile application and configuring scan settings or a storage destination. Further, even when an image scanner or a multifunction peripheral can operate standalone, the settings of the scanner or a main unit of the multifunction peripheral are also to be configured in advance. Since these settings depend on the owner of the image scanner or the multifunction peripheral, it is typically difficult for a third party to use such a scanner or multifunction peripheral comfortably.

On the other hand, services that provide image data in a broad sense include, for example, a print sticker vending machine (a so-called "print club" or "purikura" in Japan, which is like a photo booth) and an instant photo machine. However, the functions of these devices are originally designed on the assumption that an unspecified number of people use these devices. Accordingly, these devices can obtain a photograph and photographed image data with no or little preparation. For the image scanner as well, it is considered that occasion in which unspecified users can use the image scanner (e.g., a shared scanner in a public space) and potential needs (e.g., a temporary use by an employee on a business trip) are increasing. In order to meet such needs and expand users and markets of the scanning function, it is important that any person can obtain scanned image data in the shortest time and with the minimum procedure without configuring settings in advance.

The main purpose of users of the above-described print sticker vending machine and instant photo machine, for example, is to obtain a photograph. The captured image data is often required at a later date for purposes such as resizing or additional printing. Accordingly, the image data is to be stored in, for example, the device or a server for a certain period of time. By contrast, the purpose of scanning with the image scanner is to obtain scanned image data of, for example, a document, unlike the print sticker vending machine or the instant photo machine. In other words, the image scanner has needs that are opposite to the needs of the print sticker vending machine or the instant photo machine, for example. When the user of the image scanner can obtain the scanned image data immediately after scanning, the purpose of scanning can be achieved. Further, after obtaining the scanned image data, the user himself/herself can decide a storage destination in which the scanned image data is to be stored. The user does not continuously use the image scanner after the scanned image data is stored. Thus, the scanned image data is temporarily stored in, for example, a server. However, after the user obtains the scanned image data, the server does not have to keep storing the scanned image data and can delete the scanned image data at a time when the user obtains the scanned image data and no longer needs the scanned image data.

As described above, an image scanner is to be a public scanner and can be used by unspecified users, and users' true needs of "acquiring scanned image data immediately after scanning" is proposed. By satisfying such intuitive users' needs, the enhancement of user experience and satisfaction can be expected.

A description is given below of embodiments of the present invention with reference to the drawings.

FIG. 1 is a diagram illustrating an example of an overall configuration of a file providing system 1.

As illustrated in FIG. 1, the file providing system 1 includes a file providing server 2, a scanner 4, and a user terminal 6. The scanner 4 and the user terminal 6 are connected to the file providing server 2 through the Internet 7.

The file providing server 2 is a server apparatus. The file providing server 2 stores a data file received from the scanner 4 in a temporary storage area, and transmits the data file stored in the temporary storage location to the user terminal 6 in response to a request from the user terminal 6.

The scanner 4 is an image reading apparatus that optically scans an image from a document. The scanner 4 may be directly connected to the Internet 7 by Wi-Fi. Alternatively, the scanner 4 may be connected to the Internet 7 via a computer terminal. Further, the scanner 4 may transmit image data itself that is read from the document to the file providing server 2. Alternatively, the scanner 4 may perform data processing such as optical character recognition (OCR) processing on the image data that is read from the document and transmit the processing result to the file providing server 2.

Examples of the user terminal 6 include a computer terminal such as a tablet terminal or a smartphone. The user terminal 6 accesses the file providing server 2 based on a uniform resource locator (URL) displayed on the scanner 4, and downloads the data file from the file providing server 2.

Thus, in the file providing system 1 according to the present embodiment, by providing scanned data to the user terminal 6 via the file providing server 2, anyone can quickly start using the scanning function of the scanner 4 without downloading or installing software or a mobile application and further configuring settings of scanning or a storage destination in advance. At this time, it is assumed that a user physically occupying the scanner 4 to perform scanning operation is an owner of the scanned data, and the file providing server 2 causes the scanner 4 to display the URL of the scanned data and permits access to the scanned data.

Figure 2:
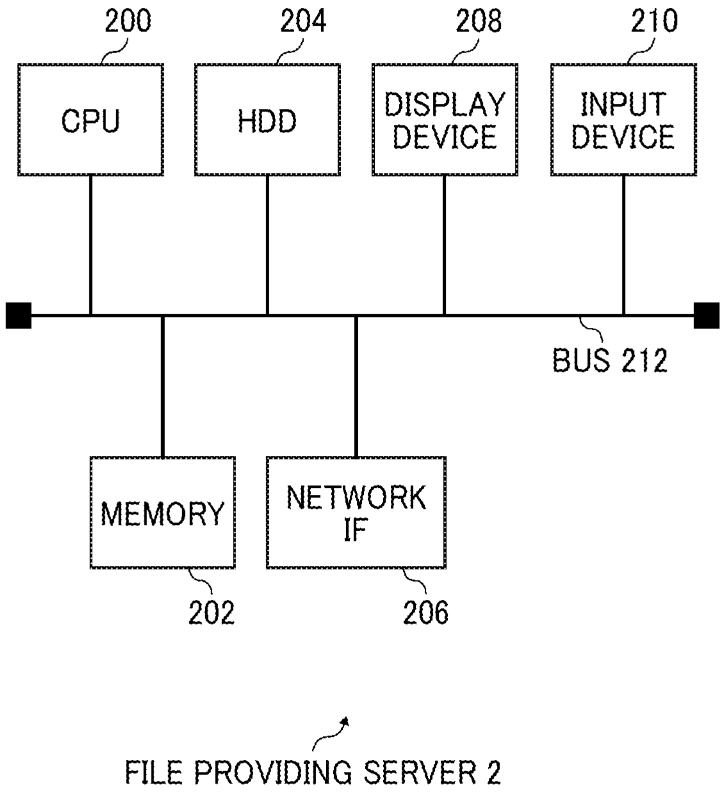
FIG. 2 is a diagram illustrating an example of a hardware configuration of a file providing server 2.

FIG. 2 is a diagram illustrating an example of a hardware configuration of the file providing server 2. The file providing server 4 is an example of a file relay apparatus according to the present invention.

As illustrated in FIG. 2, the file providing server 2 includes a CPU 200, a memory 202, an HDD 204, a network interface 206 (network IF 206), a display device 208, and an input device 210. These components are connected to each other via a bus 212.

The CPU 200 is, for example, a central processing unit.

The memory 202 is, for example, a volatile memory and functions as a main storage device. The HDD 204 is, for example, a hard disk drive device, and stores a computer program (e.g., a server program 3 illustrated in FIG. 4) and other data files as a nonvolatile storage device. The network IF 206 is an interface for wired or wireless communication, and implements connection to the Internet 7, for example.

The display device 208 is, for example, a liquid crystal display.

The input device 210 is, for example, a keyboard and a mouse.

Figure 3:
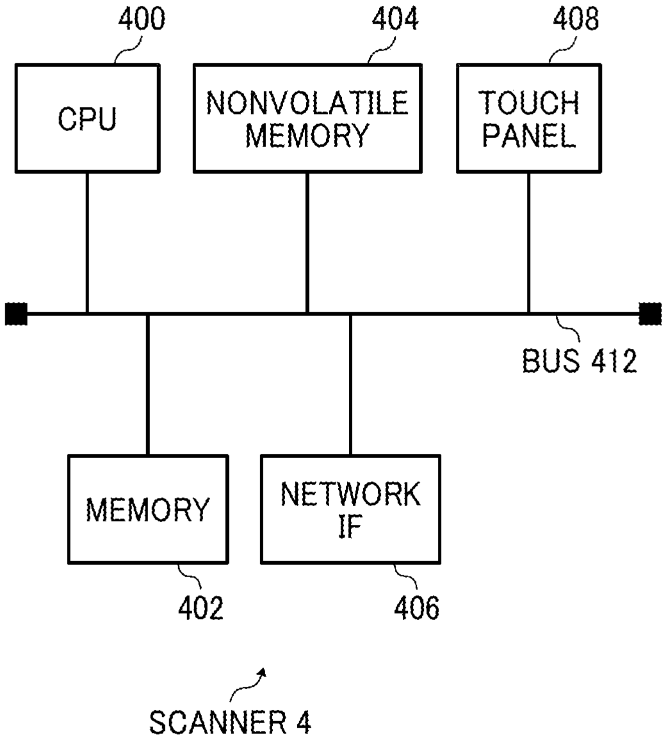
FIG. 3 is a diagram mainly illustrating an example of a hardware configuration of a control section of a scanner 4.

FIG. 3 is a diagram mainly illustrating an example of a hardware configuration of a control section of the scanner 4.

As illustrated in FIG. 3, the scanner 4 includes a CPU 400, a memory 402, which is volatile, a nonvolatile memory 404, a network interface 406 (network IF 406), and a touch panel 408. These components are connected to each other via a bus 412.

The CPU 400 is, for example, a central processing unit.

The memory 402 is, for example, a volatile memory and functions as a main storage device. The nonvolatile memory 404 stores, for example, a computer program (e.g., a scanner program 5 illustrated in FIG. 5) and other data files as a nonvolatile storage device. The network IF 406 is an interface for wired or wireless communication.

The touch panel 408 is, for example, a liquid crystal touch panel.

Figure 4:
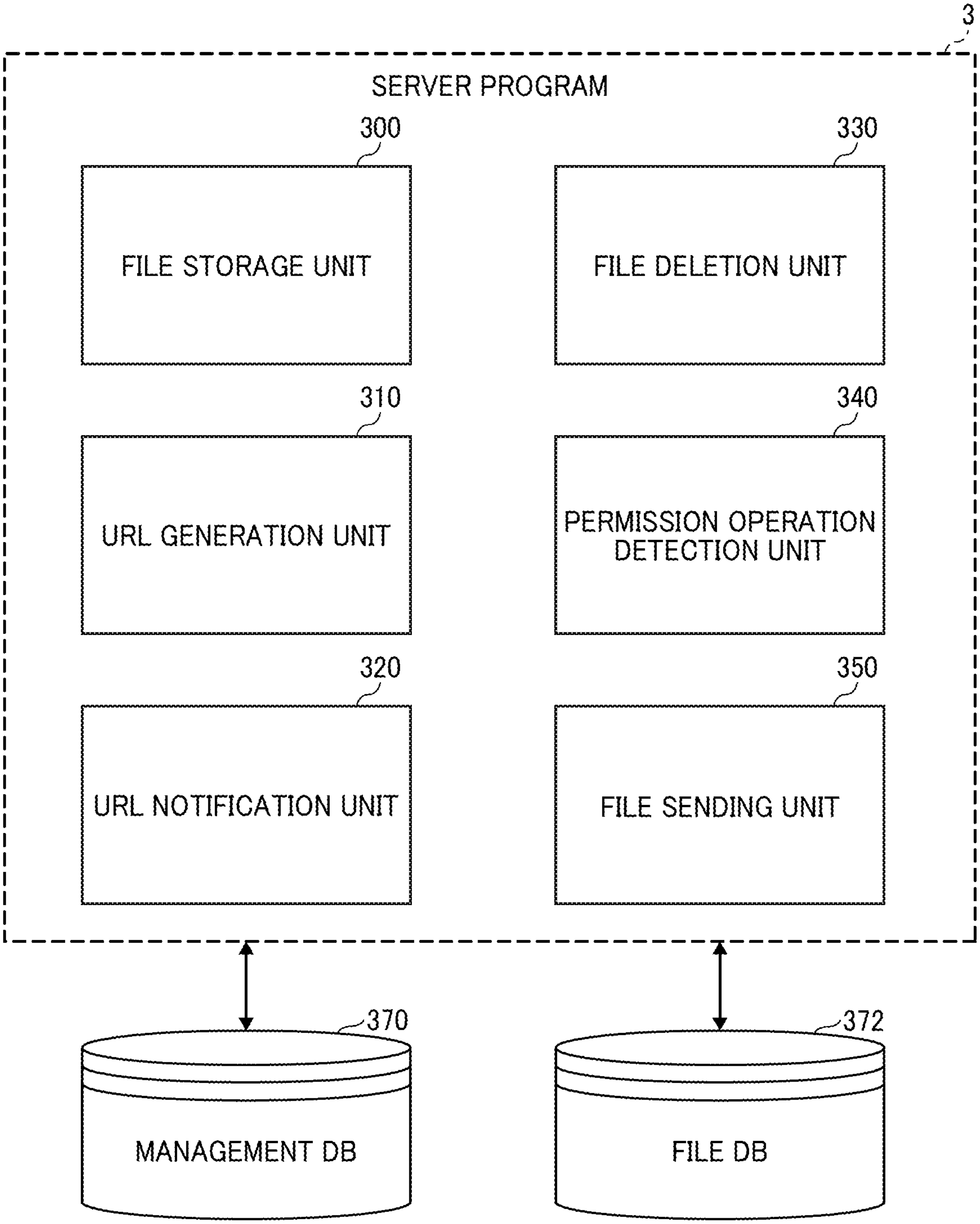
FIG. 4 is a diagram illustrating an example of a functional configuration of the file providing server 2.

FIG. 4 is a diagram illustrating an example of a functional configuration of the file providing server 2.

As illustrated in FIG. 4, the file providing server 2 of the present example is installed with a server program 3 and the installed server program 3 operates in the file providing server 2. Further, in the file providing server 2 of the present example, a management database 370 (management DB 370) and a file database 372 (file DB 372) are constructed. The server program 3 is stored in a storage medium such as a compact disc read-only memory (CD-ROM), and is installed in the file providing server 2 via the storage medium.

The server program 3 includes a file storage unit 300, a URL generation unit 310, a URL notification unit 320, a file deletion unit 330, a permission operation detection unit 340, and a file sending unit 350.

A part or all of the server program 3 may be implemented by hardware such as an application specific integrated circuit (ASIC) or may be implemented by borrowing a part of functions of an operating system (OS).

In the server program 3, the file storage unit 300 stores a data file received from the scanner 4 in a specified storage location. The file storage unit 300 of the present example stores the data file received from the scanner 4 in a storage area (temporary storage location) determined by the URL generation unit 310 in the file DB 372.

The URL generation unit 310 determines a storage location where the data file received from the scanner 4 is to be stored and generates a URL for accessing the determined storage location. For example, the URL generation unit 310 generates the URL for accessing the data file received from the scanner 4 on the basis of information indicating the determined storage location and the serial number of the scanner 4.

The URL notification unit 320 notifies the scanner 4 of information indicating the URL generated by the URL generation unit 310. The information indicating the URL may be a part or all of the URL, a short URL, or a two-dimensional code indicating the URL.

The file deletion unit 330 deletes the data file from the temporary storage location after transmitting the data file to the user terminal 6 as a response.

Further, the file deletion unit 330 deletes the data file stored in the file DB 372 when a certain period of time has elapsed since the data file was uploaded or when a certain period of time has elapsed since the information indicating the URL became displayable at the scanner.

The permission operation detection unit 340 detects that an operation for permitting a download of a data file generated by scanning process is performed at the scanner 4. The permission operation detection unit 340 of the present example detects that the operation for permitting the download is performed on the basis of a notification from the scanner 4.

The file sending unit 350 sends a data file stored in the file DB 372 in response to web access based on the URL by the user terminal 6. More specifically, when there is web access based on the URL corresponding to the data file from the user terminal 6 and when the permission operation detection unit 340 detects an operation for permitting a download, the file sending unit 350 makes the data file corresponding to the URL downloadable among data files stored in the file DB 372.

The management DB 370 stores information for managing data files (scanned data) received from the scanner 4. For example, as illustrated in FIG. 6, the management DB 370 stores management table associating data file received from the scanner 4 with identification information of the scanner that sends the data file, a URL indicating a storage location where the data file is stored, and a validity period of the URL.

The file DB 372 stores data files received from the scanner 4.

Figure 5:
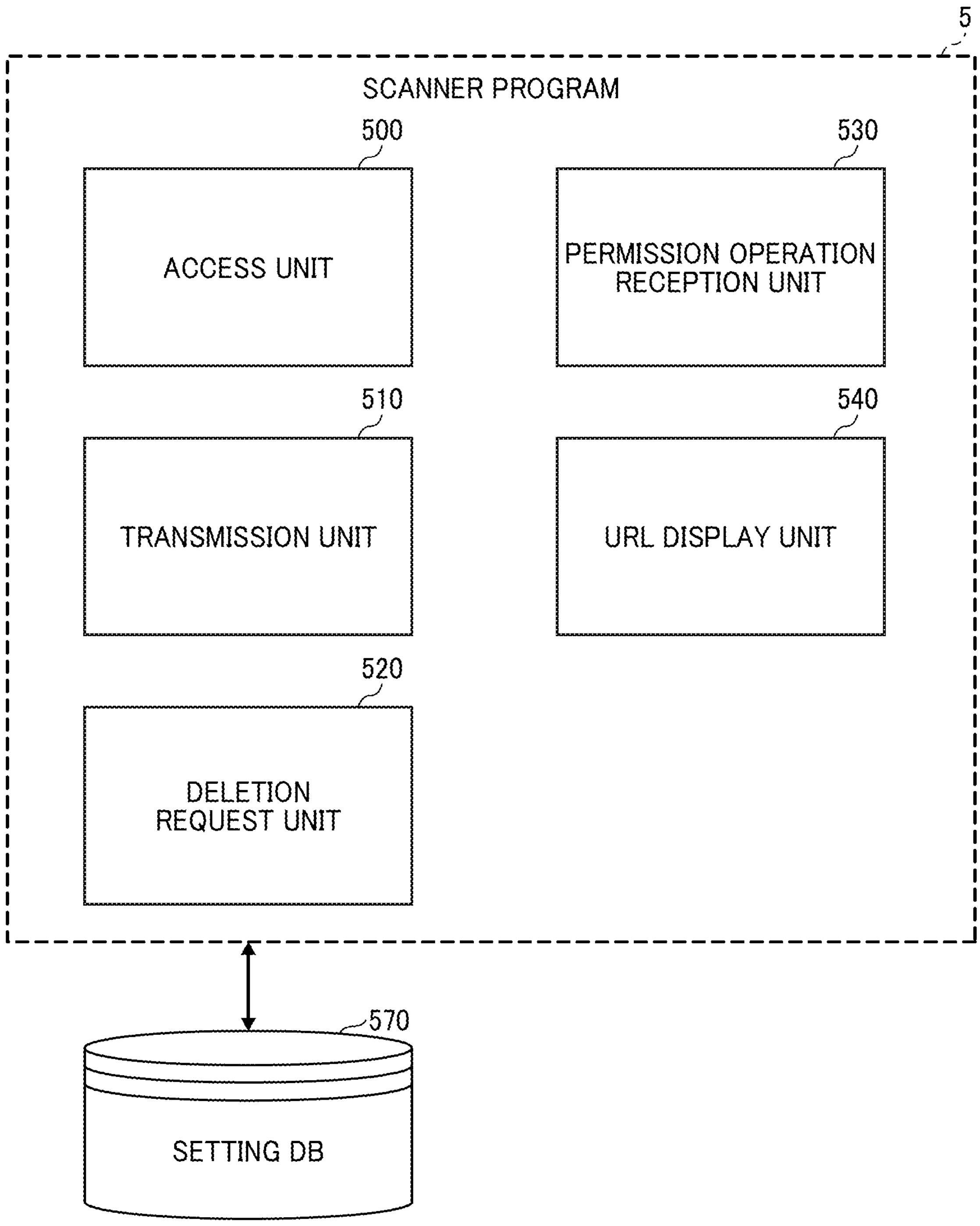
FIG. 5 is a diagram illustrating an example of a functional configuration of the scanner 4.

FIG. 5 is a diagram illustrating an example of a functional configuration of the scanner 4. As illustrated in FIG. 5, the scanner 4 of the present example is installed with a scanner program 5 and the installed scanner program 5 operates in the scanner 4. Further, in the scanner 4 of the present example, a setting database 570 (setting DB 570) is constructed. Although the scanner program 5 of the present example is installed in the scanner 4 in advance, this is just an example. Alternatively, for example, the scanner program 5 may be stored in a storage medium such as a CD-ROM and installed in the scanner 4 via the storage medium. Still alternatively, the scanner program 5 may be stored in a specific location on the Internet, and may be automatically downloaded from the specific location and installed in the scanner 4.

The scanner program 5 includes an access unit 500, a transmission unit 510, a deletion request unit 520, a permission operation reception unit 530, and a URL display unit 540.

A part or all of the scanner program 5 may be implemented by hardware such as an ASIC or may be implemented by borrowing a part of the functions of an OS.

In the scanner program 5, the access unit 500 automatically accesses the file providing server 2 on the Internet when an operation for starting scanning operation is performed. For example, access destination information for accessing the file providing server 2 is registered in advance in the setting DB 570, and in response to detection of the operation for starting scanning operation, the access unit 500 automatically accesses the file providing server 2 on the basis of the access destination information registered in the setting DB 570.

The transmission unit 510 automatically transmits a data file generated by scanning process to the file providing server 2 accessed by the access unit 500. More specifically, when the scanning operation is started, the transmission unit 510 successively transmits data obtained by scanning to the file providing server 2.

When an error occurs during the scanning operation, the deletion request unit 520 requests the file deletion unit 330 of the file providing server 2 to delete the transmitted data. The deletion request unit 520 of the present example notifies the file providing server 2 of whether the scanning operation has been successfully completed.

The URL display unit 540 displays information indicating a URL received from the file providing server 2. The URL display unit 540 of the present example converts the URL received from the file providing server 2 into a two-dimensional code and displays the converted two-dimensional code on the touch panel 408.

The permission operation reception unit 530 receives an operation for permitting transmission of the data file as a response. The permission operation reception unit 530 of the present example causes the touch panel 408 to display an operation screen that receives a selection operation of whether to permit a download of the data file, and receives the selection operation by a user.

Figure 7:
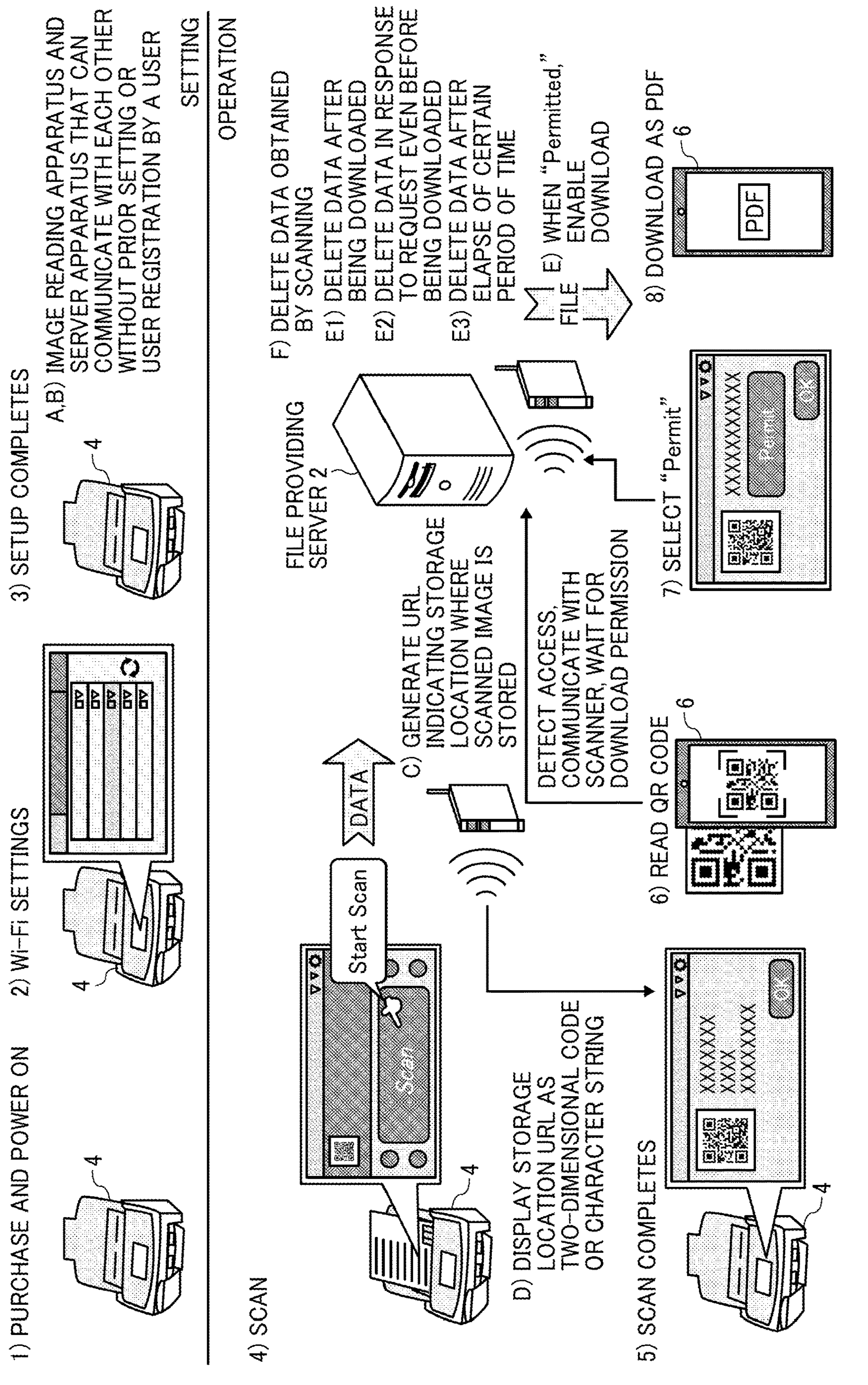
FIG. 7 is a diagram illustrating an overview of an overall operation performed by the file providing system 1.

FIG. 7 is a diagram illustrating an overview of an overall operation performed by the file providing system 1.

Figure 8:
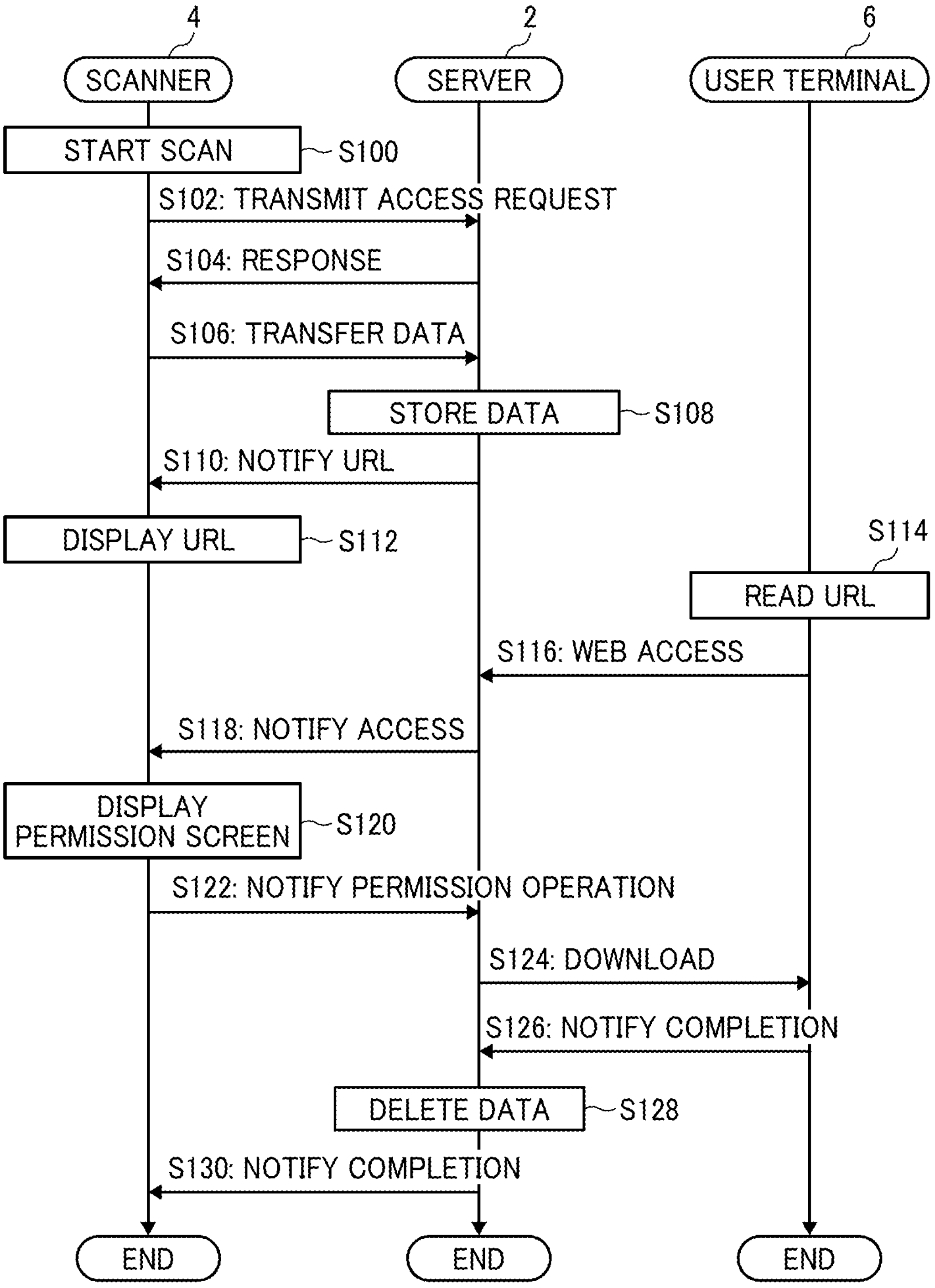
FIG. 8 is a sequence diagram illustrating an overall operation (S10) performed by the file providing system 1.

FIG. 8 is a sequence diagram illustrating an overall operation (S10) performed by the file providing system 1.

As a preparation for sharing the scanner 4, as illustrated in FIG. 7, it is enough to turn on the purchased scanner 4 and configure Wi-Fi settings. Setting information for accessing the file providing server 2 is registered in the setting DB 570 in advance. In other words, a user does neither have to preconfigure settings nor perform user registration.

During operation of the scanner 4, as illustrated in FIG. 8, when a user places a document on the scanner 4 and taps a scan button, the scanner 4 starts a scanning operation in step 100 (S100).

In step 102 (S102), the scanner 4 transmits an access request to the file providing server 2.

In step 104 (S104), the file providing server 2 responds to the access request from the scanner 4 and establishes communication.

In step 106 (S106), the scanner 4 successively transmits data generated by the scanning operation to the file providing server 2.

In step 108 (S108), the file providing server 2 temporarily stores the data successively transmitted from the scanner 4 in the order of transmission.

In step 110 (S110), the file providing server 2 generates a URL for accessing the temporarily stored data and notifies the scanner 4 of the generated URL.

In step 112 (S112), the scanner 4 converts the URL received from the file providing server 2 into a two-dimensional code, and displays the converted two-dimensional code.

In step 114 (S114), when a user photographs the two-dimensional code displayed on the scanner 4 with the user's own user terminal 6, the user terminal 4 identifies the URL from the captured two-dimensional code.

In step 116 (S116), the user terminal 6 accesses the file providing server 2 through the web on the basis of the identified URL.

In step 118 (S118), when accessed through the web from the user terminal 6, the file providing server 2 notifies the scanner 4 of the web access.

In step 120 (S120), in response to the notification from the file providing server 2, the scanner 4 displays a selection screen for receiving a selection of whether to permit a download.

In step 122 (S122), when the scanner 4 receives an operation indicating that the download is to be permitted on the displayed selection screen from the user, the scanner 4 notifies the file providing server 2 that the permission operation has been performed.

In step 124 (S124), when the file providing server 2 is notified that the permission operation has been performed from the scanner 4, the file providing server 2 enables the download of a data file corresponding to the URL and transmits the data file in response to the request from the user terminal 6.

In step 126 (S126), when the download of the data file is successfully completed, the user terminal 6 notifies the file providing server 2 of the completion of the download.

In step 128 (S128), the file providing server 2 deletes the downloaded data file from the file DB 372.

In step 130 (S130), the file providing server 2 notifies the scanner 4 of the completion of the download and the completion of the deletion of the data file.

Figure 9:
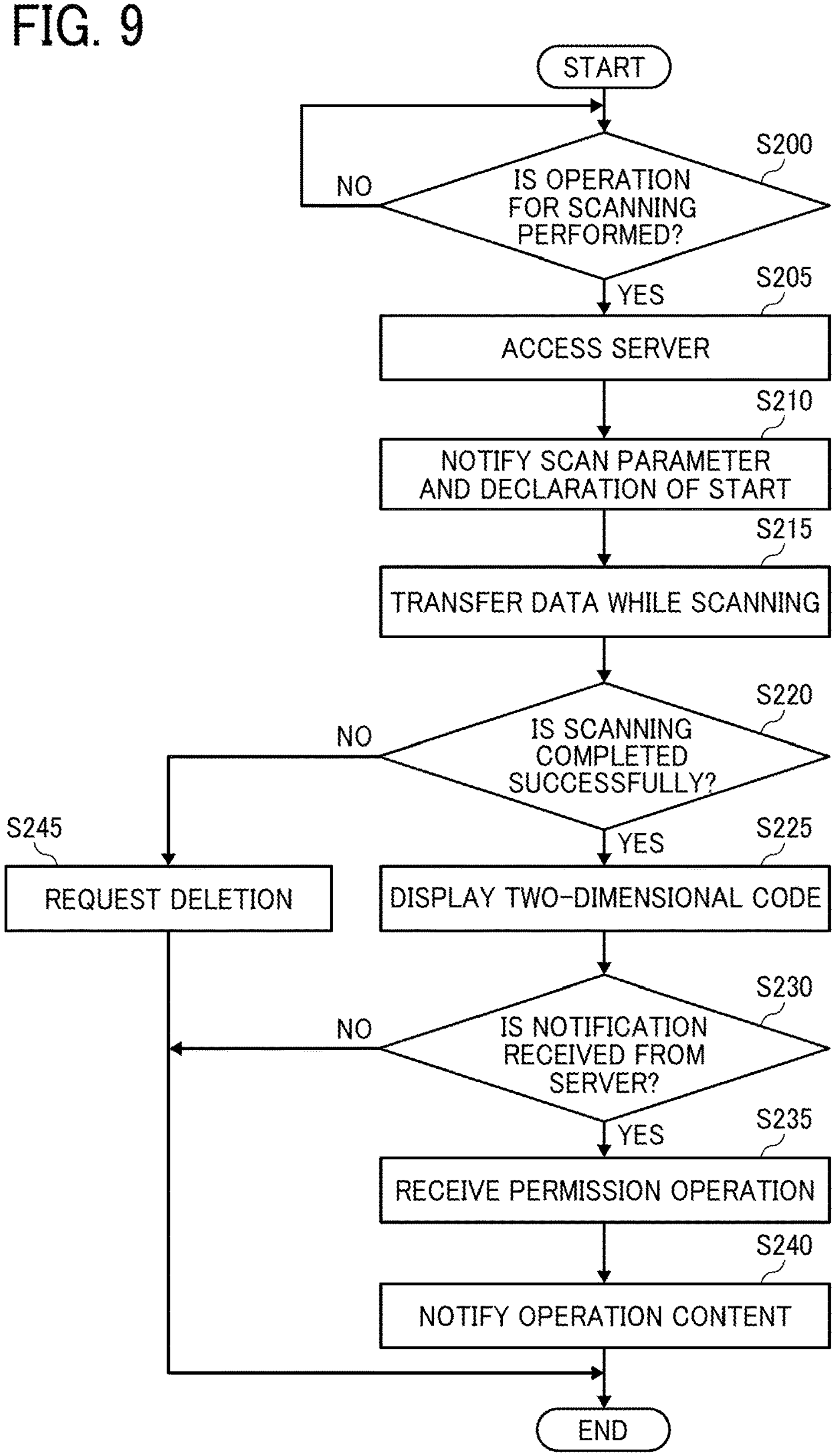
FIG. 9 is a flowchart describing an operation (S20) performed by the scanner of the file providing system 1 in more detail.

FIG. 9 is a flowchart describing an operation (S20) performed by the scanner of the file providing system 1 in more detail.

As illustrated in FIG. 9, in step 200 (S200), when the scanner 4 is turned on and the scan button is tapped (S200: Yes), the operation proceeds to a process of S205. The scanner 4 continues to wait until the scan button is tapped (S200: No).

In step 205 (S205), the access unit 500 (FIG. 5) of the scanner 4 accesses the file providing server 2 on the basis of the access destination information registered in the setting DB 570. In step 210 (S210), when the access unit 500 establishes a connection to the file providing server 2, the transmission unit 510 notifies, through the established connection, the file providing server 2 of a scan parameter and a declaration indicating that a data transfer is to be started.

In step 215 (S215), the transmission unit 510 transmits scanned data such as image data or an OCR processing result that are successively generated by the scanner 4 to the file providing server 2.

In step 220 (S220), the deletion request unit 520 determines whether scanning process has been successfully completed. When the scanning process has been successfully completed, the operation proceeds to a process of S225. When the scanning process has not been successfully completed, the operation proceeds to a process of S245.

In step 225 (S225), the URL display unit 540 converts the URL received from the file providing server 2 into a two-dimensional code, and displays the converted two-dimensional code on the touch panel 408.

In step 230 (S230), when the scanner program 5 receives, from the file providing server 2, a notification indicating that there is web access based on the URL, the operation proceeds to step S235. When the scanner program 5 does not receive within a predetermined period of time, the operation by the scanner ends.

In step 235 (S235), the permission operation reception unit 530 displays the selection screen for selecting whether to permit a download on the touch panel 408, and receives a permission operation or a non-permission operation by the user.

In step 240 (S240), the permission operation reception unit 430 notifies the file providing server 2 of a result of the selection by the user (the result of the selection indicating permission to download or non-permission to download).

In step 245 (S245), the deletion request unit 520 requests the file providing server 2 to delete the transmitted scanned data.

Figure 10:
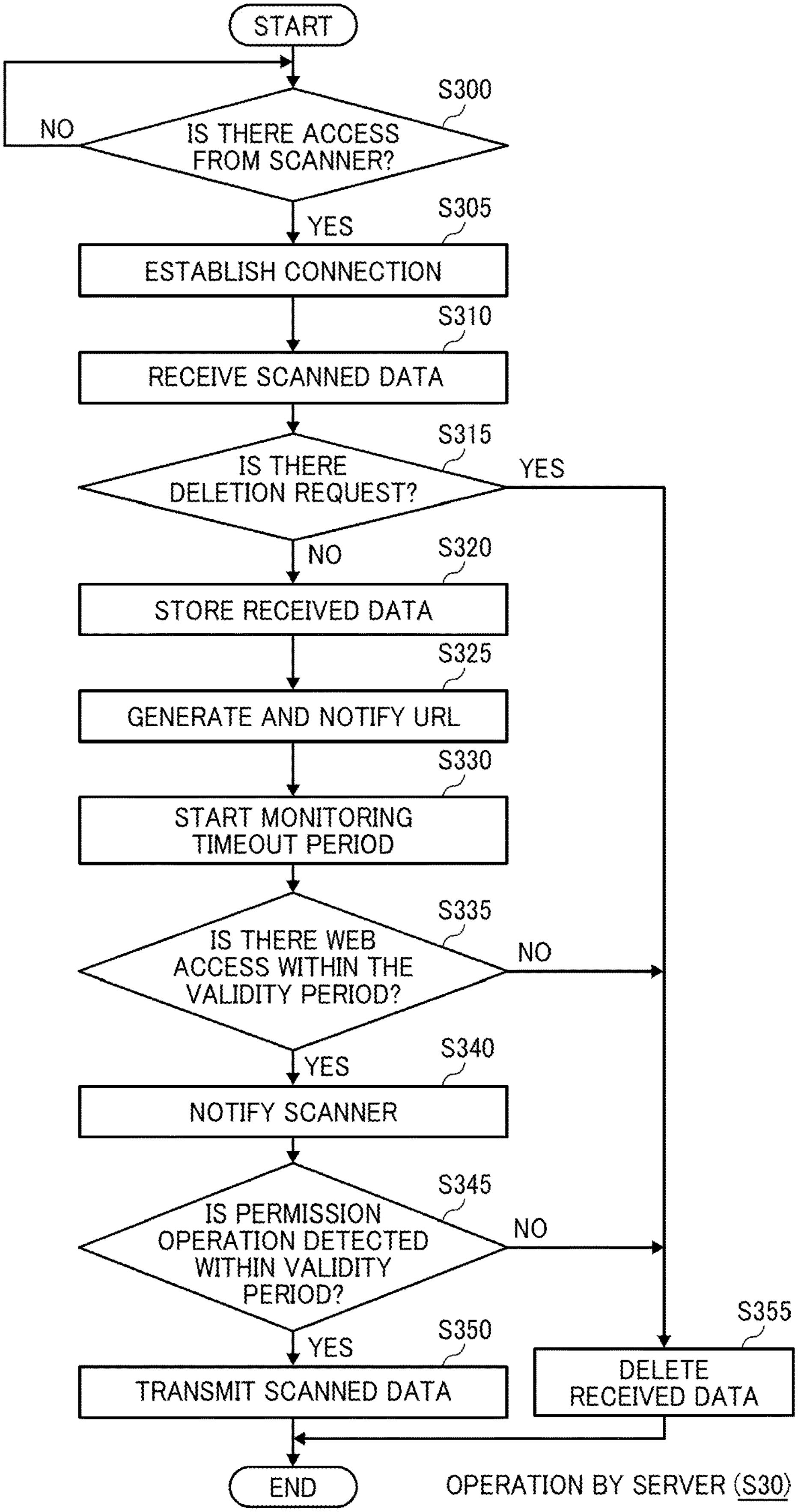
FIG. 10 is a flowchart describing an operation (S30) performed by the server of the file providing system 1 in more detail.

FIG. 10 is a flowchart describing an operation (S30) performed by the server of the file providing system 1 in more detail.

As illustrated in FIG. 10, in step 300 (S300), the file providing server 2 (the server program 3) waits until accessed from the scanner 4 (S300: No). When the file providing server 2 (the server program 3) is accessed from the scanner 4 (S300: Yes), the operation proceeds to a process of S305.

In step 305 (S305), the server program 3 (FIG. 4) responds to the access request from the scanner 4 and establishes a connection with the scanner 4.

In step 310 (S310), the server program 3 receives scanned data transmitted from the scanner 4.

In step 315 (S315), the server program 3 determines whether a deletion request of the transmitted scanned data is from the scanner 4 (the deletion request unit 520 of FIG. 5). When the server program 3 does not receive the deletion request, the operation proceeds to a process of S320. When the server program 3 receives the deletion request, the operation proceeds to a process of S355.

In step 320 (S320), the file storage unit 300 stores the scanned data received from the scanner 4 in a temporary storage location determined by the URL generation unit 310 in a storage area of the file DB 372.

In step 325 (S325), the URL generation unit 310 generates a URL for accessing the scanned data in the temporary storage location stored by the file storage unit 300. The URL notification unit 320 notifies the scanner 4 of the URL generated by the URL generation unit 310.

In step 330 (S330), the file deletion unit 330 starts monitoring a timeout period of the URL from a time when the URL is notified to the scanner 4. A period of time until timeout is a validity period in this example.

In step 335 (S335), the server program 3 determines whether the user terminal 6 accesses the server through the web on the basis of the notified URL within the validity period. When the web access is received within the validity period, the operation proceeds to a process of S340. When the web access is not received within the validity period, the operation proceeds to a process of S355.

In step 340 (S340), the permission operation detection unit 340 notifies the scanner 4 that the web access based on the notified URL is received, and requests the scanner 4 to receive an operation for permitting a download.

In step 345 (S345), when the permission operation detection unit 340 receives, from the scanner 4 (the permission operation reception unit 530 of FIG. 5), a notification indicating that an operation for permitting the download is received within the validity period, the operation proceeds to a process of S350. When the permission operation detection unit 340 does not receive, from the scanner 4, the notification indicating that an operation for permitting the download is received within the validity period, the operation proceeds to a process of S355.

In step 350 (S350), the file sending unit 350 enables the download of the scanned data corresponding to the notified URL, and transmits the scanned data in response to the request from the user terminal 6.

In step 355 (S355), the file deletion unit 330 deletes the scanned data received from the scanner 4 from the file DB 372, and notifies the scanner 4 of the completion of the deletion. Further, when the URL has been already generated, the file deletion unit 330 invalidates the generated URL.

As described above, according to the file providing system 1 of the present embodiment, the scanner 4 can be shared securely with a simple procedure by permitting a download of scanned data on the condition that a URL on the scanner 4 is read and a permission operation is performed on the scanner 4. In particular, since information for accessing the file providing server 2 is preset in the scanner 4, a user does not have to configure settings of the scanner 4 in advance.

In other words, when a user uses the scanner 4, for example, installation of dedicated software or an application, presetting, and user registration are not required at all. Further, a user can immediately obtain image data when the user wants the image data. Furthermore, by completing a series of processes including the scanning of a document, the acquisition of scanned image data, and the deletion of the scanned image data stored in the file providing server 2 in front of the scanner 4 (on the spot), the possibility of an unauthorized access to the scanned image data or information security incidents caused by human error can be reduced.

Modification

A modification of the above-described embodiments is described.

Figure 11:
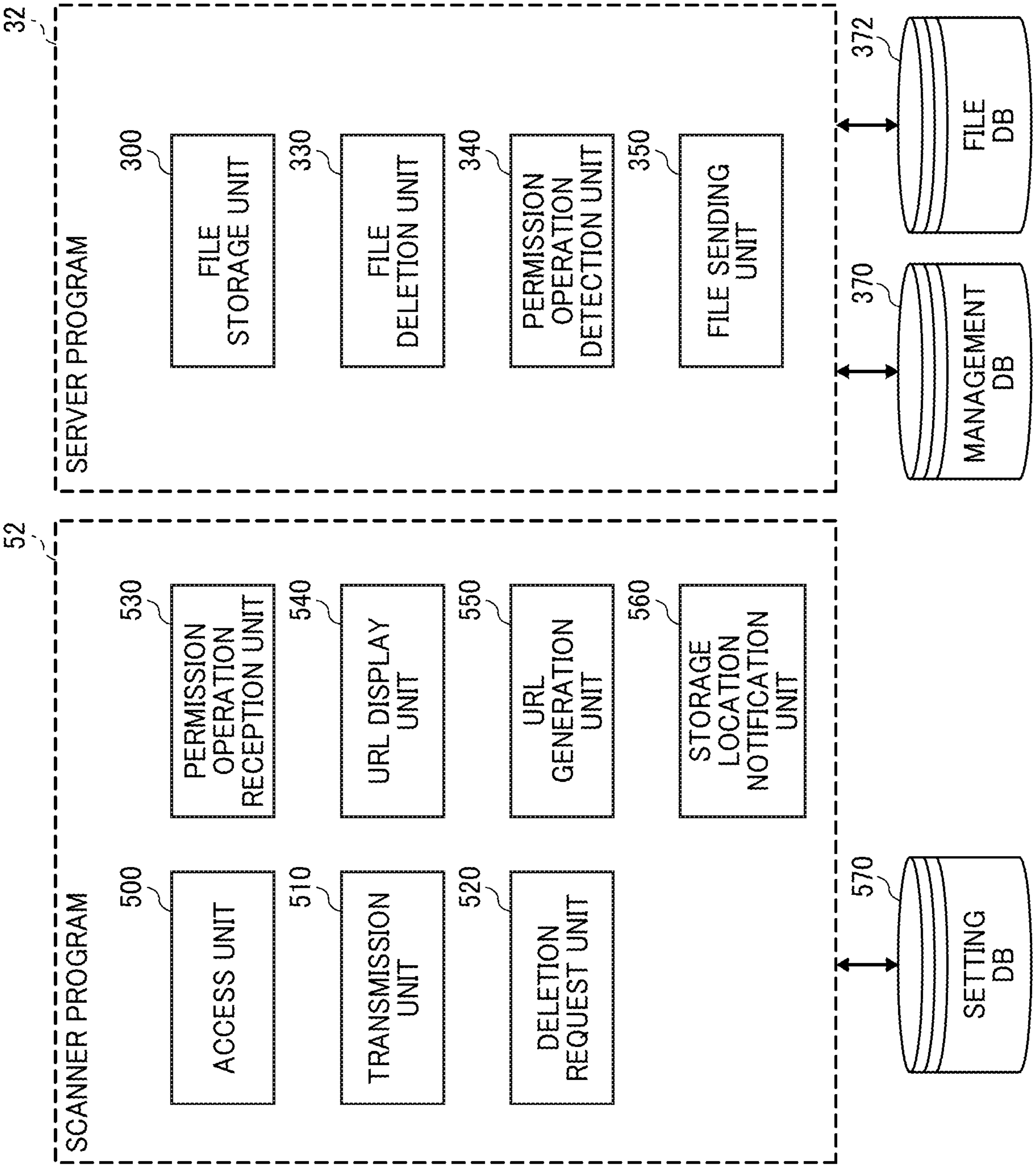
FIG. 11 is a diagram illustrating an example of functional configurations of a server program 32 and a scanner program 52 according to a modification.

FIG. 11 is a diagram illustrating an example of functional configurations of a server program 32 and a scanner program 52 according to the modification.

In the above-described embodiment, the file providing server 2 determines a storage location where scanned data is to be stored and generates a URL for accessing the storage location.

Alternatively, in the modification, the scanner 4 designates a storage location where scanned data is to be stored, and the scanner generates a URL for accessing the storage location. Specifically, as illustrated in FIG. 11, the scanner program 52 of the modification has a configuration in which a URL generation unit 550 and a storage location notification unit 560 are added to the scanner program 5 of FIG. 5.

The URL generation unit 550 determines a storage location where scanned data is to be stored and generates a URL for accessing the storage location.

The storage location notification unit 560 notifies the file providing server 2 of the storage location determined by the URL generation unit 550.

The URL display unit 540 according to the modification displays a two-dimensional code of the URL generated by the URL generation unit 550.

The file storage unit 300 according to the modification stores received scanned data in the storage location notified by the storage location notification unit 560.

In the above description, embodiments of the present invention and the modification of the embodiments are described. However, the description of the above embodiments and the modification of the embodiments is given by way of example, and is not intended to limit the scope of the invention. The above-described embodiments can be implemented in a variety of other forms. Various omissions, substitutions, and changes in the above-described embodiment may be made without departing from the spirit of the invention. The above-described embodiments and the modification thereof are included in the scope and the spirit of the invention, and also included in the invention described in the claims and the equivalent thereof.

REFERENCE SIGNS LIST

1 File providing system
2 File providing server
3 Server program
4 Scanner
5 Scanner program
6 User terminal

The invention claimed is:

1. A data file providing method comprising:

by an image input apparatus, uploading a data file generated by scanning process to a file relay apparatus on a network;

by the file relay apparatus, storing the uploaded data file in a temporary storage location;

by the image input apparatus, outputting information indicating a uniform resource locator (URL) of the temporary storage location;

displaying, at the image input apparatus, a screen for prompting a user to select whether to permit transmission of the data file after uploading the data file;

in response to a web access based on the URL from a user terminal, notifying the image input apparatus of the web access, by the file relay apparatus, and thereafter receiving, at the image input apparatus, an operation for permitting transmission of the data file; and by the file relay apparatus, transmitting the data file stored in the temporary storage location to the user terminal in response to the web access based on the URL, wherein the transmitting includes enabling the transmission of the data file stored in the temporary storage location when receiving the operation for permitting.

2. The data file providing method of claim 1, further comprising, by the file relay apparatus, deleting the data file from the temporary storage location after completing transmission of the data file.

3. The data file providing method of claim 1, further comprising, by the file relay apparatus, deleting the data file stored in the temporary storage location when a certain period of time elapses from a time when the data file is uploaded or a time when the information indicating the URL becomes displayable at the image input apparatus.

4. The data file providing method of claim 1, wherein the displaying includes displaying a two-dimensional code indicating the URL of the temporary storage location.

5. The data file providing method according to claim 1, wherein the screen comprises a selection screen for receiving a selection of whether to permit transmission of the data file, and the operation for permitting transmission of the data file is received on the selection screen.

6. An image input apparatus comprising:

a display; and circuitry configured to:

access a server on a network in response to an operation for starting scanning operation;

transmit a data file generated by scanning process to the server;

display information indicating a URL received from the server on the display;

display, on the display, a screen for prompting a user to select whether to permit transmission of the data file after transmitting the data file; and in response to a web access to based on the URL from a user terminal, receive, from the server, a notification of the web access, and thereafter receive an operation for permitting transmission of the data file.

7. The image input apparatus of claim 6, wherein, in response to a start of the scanning operation, the circuitry successively transmits data obtained by scanning to the server, and wherein the circuitry is further configured to request the server to delete the transmitted data when an error occurs during the scanning operation.

8. The image input apparatus of claim 6, wherein the circuitry accesses the server based on access destination information registered in advance before the image input apparatus is shipped from a factory.

9. A file providing system comprising:

an image input apparatus; and a file relay apparatus connected to the image input apparatus through a network, wherein the image input apparatus includes:

a display; and first circuitry configured to:
access the file relay apparatus in response to an operation for starting scanning operation;
transmit a data file generated by scanning process to the file relay apparatus;
display information indicating a URL of a storage location of the data file on the display;
display, on the display, a screen for prompting a user to select whether to permit transmission of the data file after transmitting the data file; and
in response to a web access based on the URL from a user terminal, receive, from the file relay apparatus, a notification of the web access, and thereafter, receive an operation for permitting transmission for the data, wherein the file relay apparatus includes:
second circuitry configured to:
store the data file received from the image input apparatus in a specified storage location; and
send the data file stored in the storage location in response to the web access based on the URL from the image input apparatus, and wherein the second circuitry enables to send the data file stored in the storage location when the first circuitry receives the operation for permitting.

* * * * *